United States Patent [19]

Baines

[11] Patent Number: 5,822,220
[45] Date of Patent: Oct. 13, 1998

[54] PROCESS FOR CONTROLLING THE EFFICIENCY OF THE CAUSTICIZING PROCESS

[75] Inventor: Glenn H. Baines, Austin, Tex.

[73] Assignee: Fisher-Rosemount Systems, Inc., Austin, Tex.

[21] Appl. No.: 706,840

[22] Filed: Sep. 3, 1996

[51] Int. Cl.$^6$ .............................. D21C 11/00; D21C 7/14
[52] U.S. Cl. .............................. 364/528; 395/11; 395/22; 395/68; 395/906; 364/151; 422/108; 423/432
[58] Field of Search .......................... 395/20–23, 10–11, 395/50, 60, 68, 906; 364/148–149, 151, 164, 500, 165; 422/108, 62

[56] References Cited

U.S. PATENT DOCUMENTS

| | | | |
|---|---|---|---|
| 4,094,959 | 6/1978 | Ball et al. | 364/164 |
| 4,236,960 | 12/1980 | Huttman et al. | 162/30.11 |
| 4,536,253 | 8/1985 | Bertelsen | 162/30.11 |
| 4,798,655 | 1/1989 | Diamond | 202/775 |
| 5,121,467 | 6/1992 | Skeirik | 395/11 |
| 5,142,612 | 8/1992 | Skeirik | 395/11 |
| 5,197,114 | 3/1993 | Skeirik | 395/11 |
| 5,212,765 | 5/1993 | Skeirik | 395/22 |
| 5,213,663 | 5/1993 | Muscow | 162/49 |
| 5,282,261 | 1/1994 | Skeirik | 395/22 |
| 5,282,931 | 2/1994 | LeClerc et al. | 162/49 |
| 5,378,320 | 1/1995 | LeClerc et al. | 162/49 |
| 5,565,364 | 10/1996 | Schaefer et al. | 395/22 |
| 5,616,214 | 4/1997 | LeClerc | 162/49 |

FOREIGN PATENT DOCUMENTS

PCT/US97/ 14645 8/1997 WIPO.

*Primary Examiner*—Emanuel Todd Voeltz
*Assistant Examiner*—Cuong H. Nguyen
*Attorney, Agent, or Firm*—Marshall, O'Toole, Gerstein, Murray & Borun

[57] ABSTRACT

Continuous measurements are made of a characteristic of the individual components of green liquor fed to a slaker and white liquor exiting from the slaker. The liquor component measurements provide a precise characterization of the liquors allowing for a more efficient control of the causticizing reaction in the kraft process. The individual component measurements are provided as inputs, along with certain ambient measurements, to a non-linear controller. The controller produces a causticizing control signal which is used to control the amount of lime introduced to the slaker. The controller is adapted to a particular process installation through the application of data collected from that installation. The controller, for example a neural network or fuzzy logic controller, produces a causticizing control signal according to unique parameters developed for the specific installation.

24 Claims, 3 Drawing Sheets

PROCESS FOR CONTROLLING THE EFFICIENCY OF THE CAUSTICIZING PROCESS

FIELD OF THE INVENTION

The present invention relates to a control system for the control of the causticizing reaction as part of a kraft liquor processing system. Particularly, the present invention provides a method for measuring the components making up the input to the causticizing reaction, green liquor, and the components making up the product of the causticizing reaction, white liquor. The liquor component measurements are evaluated to produce a precise, non-linear control of the causticizing reaction.

STATEMENT OF THE PROBLEM

The kraft or sulphate process is the most widely used wood pulping process. The process is a circular one in that the chemicals used to achieve the desired processing steps are themselves recovered in later steps and reused in the process. The degree to which each step of the process occurs with the maximum efficiency greatly impacts the purity of the final white liquor as well as the cost of the overall process.

In the kraft process, wood chips are digested to dissolve the lignin that holds the wood fibers together thereby producing clean fibers for further processing into a myriad of paper-based products. The digestion of the wood chips occurs in an alkaline solution mainly consisting of NaOH ("hydroxide") and $Na_2S$ ("sulfide"). As the process proceeds, the hydroxide becomes consumed and the sulfide slowly converts to hydroxide and maintains a residual throughout the cook. The resulting pulp fibers are washed and removed leaving a solution, called black liquor, containing the lignin dissolved from the wood chips and the residue hydroxide and sulfide. The black liquor is burned in a boiler leaving a smelt primarily consisting of sulfide and $Na_2CO_3$ ("carbonate"). This smelt is dissolved in water or "weak wash liquor" to produce green liquor. The objective of the remaining steps of the process is to convert the carbonate of the green liquor to hydroxide so that the hydroxide can be recycled and reused in the pulping process.

The reaction for converting the carbonate to hydroxide is often referred to as the "causticizing process" or the "causticizing reaction". The causticizing reaction, carried out in a "slaker" and a series of "causticizers", produces a material known as white liquor which ideally has a high degree of hydroxide and only a small amount of carbonate. An inefficient causticizing process results in relatively less hydroxide than ideal and more carbonate than ideal. The causticizing reaction is controlled by the amount of lime introduced to the slaker and the flow rate of green liquor into the slaker. To produce white liquor having the appropriate characteristics, lime must be input to the slaker at the appropriate rate. There are various known approaches for measuring characteristics of the green liquor and/or the white liquor and relating those measurements to the current state of the causticizing reaction. The objective of each of these known methods is to provides an appropriate signal for the control of lime introduction to the slaker. U.S. Pat. No. 4,236,960 issued to Hultman et al. on Dec. 2, 1980 describes one method for controlling the causticizing reaction. A sample stream of green liquor and a sample stream of white liquor are routed to a $CO_2$ analyzer. A single $CO_2$ analyzer is used to make sequential measurements of the liquors or two $CO_2$ analyzers are used, one for each liquor. Each of the sample liquors is mixed with an acid solution so as to acidify the sample and convert carbonate to carbon dioxide gas. The amount of carbon dioxide gas is measured and the $CO_2$ measurement is used as an indicator of the carbonate in the green liquor and in the white liquor. Various calculations are provided whereby the $CO_2$ measurement for each liquor is related to the carbonate level in the liquor. The amount of lime introduced to the slaker is adjusted accordingly. The Hultman method measures only a sample of the liquor. The measurement is relatively complex in that it involves introducing an additional reaction to create a by-product, $CO_2$, that can be measured. The measurement of $CO_2$ is not directly related to the causticizing reaction and is therefore only an inferred measurement.

U.S. Pat. No. 4,536,253 issued to Bertelsen on Aug. 20, 1985 describes another method for controlling the causticizing reaction. Bertelsen teaches that the progress of the causticizing reaction can be measured by making a differential conductivity measurement. The conductivity of the green liquor is measured prior to the slaker and the conductivity of the white liquor is measured after the slaker. Equations are provided whereby the conductivity measurements are related to the progress of the causticizing reaction. The amount of lime introduced into the slaker is adjusted accordingly. White and green liquor are comprised of various components each of which has its own set of characteristics. A measurement of a single characteristic of the entire white or green liquor, as taught by Bertelsen, can result in error when the component characteristics vary in such a way that the combination of the component characteristics result in a total liquor characteristic measurement that masks the component characteristics. For example, green liquor has a small amount of hydroxide which contributes disproportionally to the conductivity measurement of the green liquor since the carbonate component of the green liquor has a relatively low conductivity. Thus, a relatively small variation in the amount of hydroxide in the green liquor results in a disproportionally significant change in the conductivity measurement of the green liquor. The opposite problem occurs on the other side of the causticizing reaction when measuring the conductivity of the white liquor. The Bertelsen method assumes that chemicals other than those of interest to the causticizing reaction are not present or do not vary in the measured liquors. This assumption is rarely true in practice and leads to errors in the Bertelsen measurement. The Bertelsen method also relies on a rigid mathematical formulation based on the conductivity measurements even though there are multiple components of each of the liquors, each of which can vary independently.

There exists a need for a method of controlling the causticizing reaction for the production of white liquor that is responsive to the individual components of the green liquor and the white liquor. There exists a further need for a method of controlling the causticizing reaction that measures a characteristic of each relevant component of each of the liquors. There exists a further need for accomplishing the above in a system that continuously measures the stream of liquor as opposed to sampling the liquor stream. There exists a further need to combine the individual liquor component data to produce a non-linear control signal to optimize the efficiency of the causticizing reaction.

STATEMENT OF THE SOLUTION

The present invention solves the above and other problems, thereby advancing the useful arts, by providing methods and apparatus for controlling the causticizing reaction. Characteristics of the components of the green liquor and of the components of the white liquor are measured. The measured component characteristics are used to derive a control signal for controlling the input of lime to the causticizing reaction. Measurement of the liquor component characteristics results in a control scheme that is sensitive to complex changes in the mixture of components within the liquors. The causticizing reaction is thereby controlled more efficiently and effectively than was heretofore possible.

The primary constituents of the green liquor and of the white liquor (carbonate, sulfide and hydroxide) are measured individually to provide the control system with a complete characterization of the reagents participating in the causticizing reaction. Changes in the amount of an individual liquor component are thus accounted for by the control system of the present invention. The relationship between the relative concentration of green liquor components and the relative concentration of white liquor components is complex and non-linear. The control system of the present invention provides a non-linear, application adaptable evaluation of the measured inputs to provide an appropriate output signal for control of the rate of lime introduction.

In a method of the present invention, the amount of carbonate, hydroxide and sulfide in the green liquor is measured just prior to the point in the process where the green liquor is fed into the slaker to begin the causticizing process. Concurrently, the carbonate, hydroxide and sulfide in the white liquor is measured just subsequent to the point in the process where the white liquor exits from the slaker. The white and green liquor component measurements are evaluated by the controller of the present invention which in turn produces a causticizing control signal. The causticizing control signal is used to adjust the rate at which lime is introduced to the slaker.

In a further method of the present invention an additional measurement point is utilized after the series of causticizers. The component measurements from this measuring sensor are representative of the quality of the completed white liquor and are also transmitted as inputs to the controller of the present invention.

In a further method of the present invention the controller, to which the liquor component measurement values are input, is comprised of a neural network. The neural network is "trained" to produce the desired causticizing control signal for any given set of liquor component measurements input to the neural network. An installation-specific configuration of the neural network is thereby achieved.

In a further method of the present invention the controller, to which the liquor component measurement values are input, is comprised of a fuzzy logic controller. The fuzzy logic controller is tuned with the appropriate scaling factors to produce the desired causticizing control signal for any given set of liquor component measurements input to the fuzzy logic controller. An installation-specific configuration of the fuzzy logic controller is thereby achieved.

According to another aspect of the present invention, polarographic measurements are made to determine the concentration of each liquor component in the various liquors. The component polarographic measurements made at each point in the process are input to the controller. The controller evaluates the liquor component polarographic measurements to produce the desired causticizing control signal. The causticizing control signal is used to adjust the rate of lime introduced to the slaker in which is occurring the causticizing reaction.

In a further embodiment of the present invention near-infrared spectroscopy measurements are made of the green and white liquor components. The near-infrared measurements made at each point in the process are input to the controller. The controller evaluates the liquor component near-infrared measurements to produce the desired causticizing control signal. The causticizing control signal is used to adjust the rate of lime introduced to the slaker in which is occurring the causticizing reaction.

DETAILED DESCRIPTION

Figure 1:
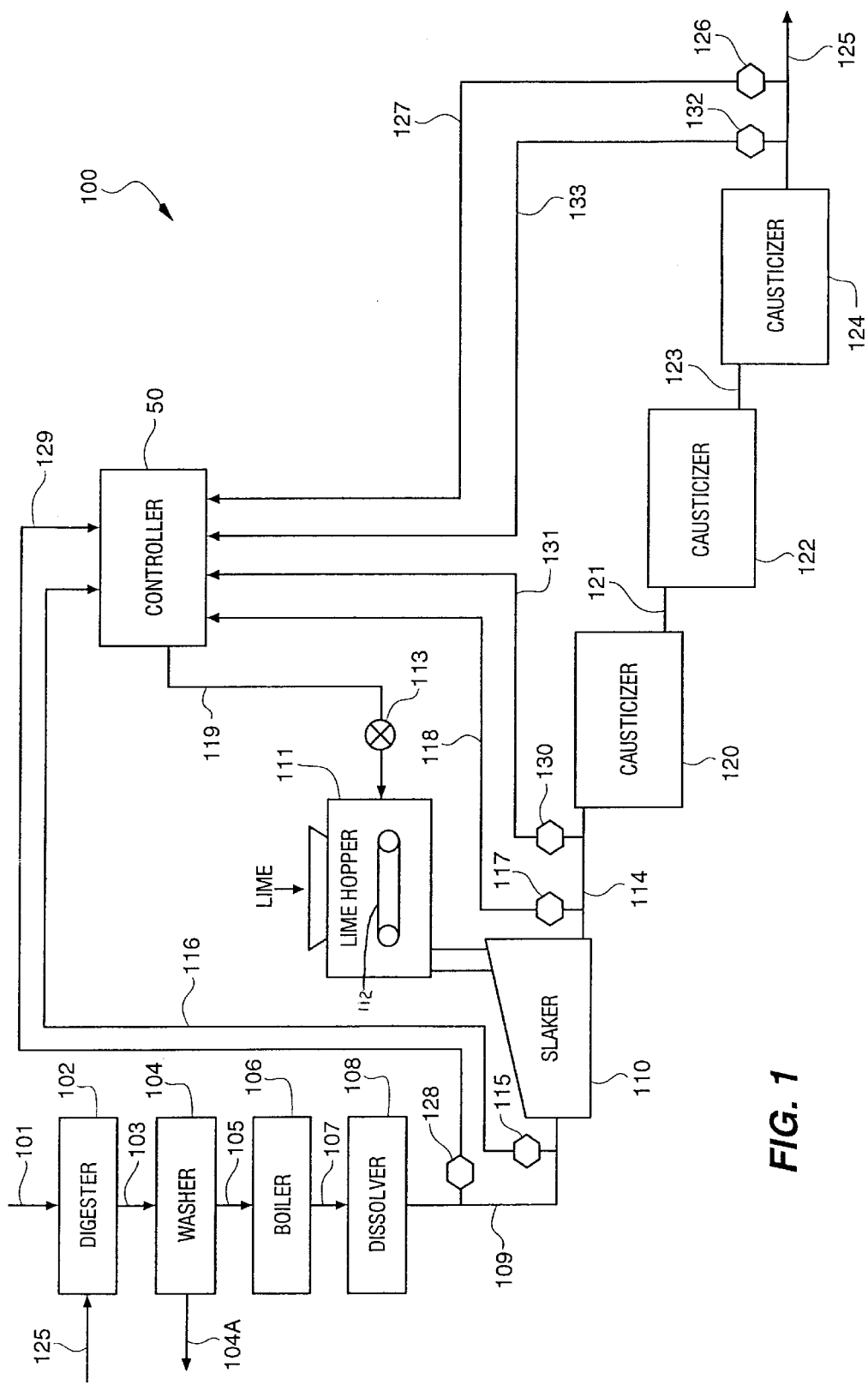
FIG. 1 is a schematic representation of a causticizing process according to the present invention.

Overall Process—FIG. 1

FIG. 1 depicts a schematic view of the flow of material and information in a causticizing process 100 according to the present invention. The overall operation of process 100 is described with respect to FIG. 1. Wood chips enter digester 102 through line 101. In digester 102 the wood chips are dissolved in a solution containing mainly NaOH and $Na_2S$. During the digestion process the lignin is dissolved to liberate the pulp fibers from the wood for further processing. The fibers dissolved in solution are conveyed through line 103 to washer 104 where wash water is used to wash residue of the digestion process from the pulp fibers. The pulp fibers are conveyed through line 104A for further processing (not shown). The residue of the digestion process, called black liquor, is conveyed to boiler 106 through line 105. The black liquor is combusted in boiler 106 leaving a smelt that is conveyed over line 107 to dissolver 108. The smelt is mixed with an aqueous solution, sometimes called "weak wash" or "weak water wash", in dissolver 108 to produce green liquor. Green liquor is composed primarily of a high content of $Na_2CO_3$ ("carbonate") and a low content of NaOH ("hydroxide"). The next steps in process 100 are directed at converting as much as possible of the carbonate in the green liquor into hydroxide in the white liquor.

Green liquor is fed through line 109 to slaker 110. Lime from lime hopper 111 is introduced to slaker 110 by the operation of lime conveyor 112. The lime reacts with the green liquor, as described in more detail below, to convert $Na_2CO_3$ to NaOH. All the $Na_2CO_3$ of the green liquor is not, however, converted to NaOH by the operation of slaker 110. The output of slaker 110 is therefore conducted to a series of causticizers, 120, 122 and 124, where, through mixing of the material, further conversion of $Na_2CO_3$ to NaOH is accomplished. The control of lime conveyor 112 is described below. The output of slaker 110 is directed through line 114 to causticizer 120. The output of causticizer 120 is conducted through line 121 to causticizer 122. The output of causticizer 122 is conducted through line 123 to causticizer 124. In practice there may be any number of causticizers to which the material is sequentially directed with the effect that the causticizing reaction is completed to a greater degree with each causticization step. The output of causticizer 124 in line 125 is the finished white liquor containing mainly NaOH is well as small amounts of $Na_2CO_3$ and Na₂S. The white liquor is conducted through line 125 back to digester 102.

Sensors 115, 117 and 126 generate signals, as described below with respect to FIGS. 1–3, which are transmitted over wires 116, 118 and 127, respectively, to controller 50. The signals generated by sensors 115, 117 and 126 are indicative of the amount of individual liquor components at the respective measurement points in process 100. Sensors 128, 130 and 132 generate ambient condition measurement signals, as described below with respect to FIGS. 1–3, which are transmitted over wires 129, 131 and 133, respectively to controller 50.

Causticization Process—FIG. 1

The green liquor input to slaker 110 over line 109 is characterized by a small content of NaOH and Na₂S and a large content of Na₂CO₃. In order to re-form the white liquor which is primarily comprised of NaOH for use in the digestion process, lime is added to the slaker along with the green liquor. The following reactions occur beginning in the slaker:

slaking reaction: $CaO + H_2O \leftrightarrows Ca(OH)_2$

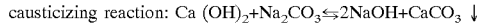
causticizing reaction: $Ca(OH)_2 + Na_2CO_3 \leftrightarrows 2NaOH + CaCO_3 \downarrow$ The slaking reaction is effectively the lime reacting with water to create calcium hydroxide. The calcium hydroxide then reacts with the carbonate in the causticizing reaction to form hydroxide. The term "causticizing reaction" is commonly used to refer to the process by which both of the above chemical reactions occur. The desired outcome of these reactions is to convert all of the Na₂CO₃ to NaOH although in practice this objective is never fully achieved. To encourage the above reactions to completion a series of causticizers, beginning with causticizer 120 of FIG. 1, are used to further convert Na₂CO₃ to NaOH. Each of causticizers 120, 122 and 124 mixes the white liquor solution for a period of time. The output of each successive causticizer is characterized by increasingly larger contents of NaOH and smaller contents of Na₂CO₃. There is an amount of Na₂S in the green liquor which does participate in the causticizing reaction and there is also a small amount of Na₂S in the white liquor. Another byproduct of the causticizing reactions is the calcareous silt (CaCO3) from which the white liquor is separated.

The quality of the white liquor is judged by the extent to which the white liquor is characterized by a high content of NaOH and a small content of Na₂CO₃. The introduction of lime, CaO, to slaker 110 is the critical point of control for determining the quality of the white liquor. Controlling the rate of lime introduced to slaker 110 is the focus of the methods and apparatus of the present invention.

Figure 2:
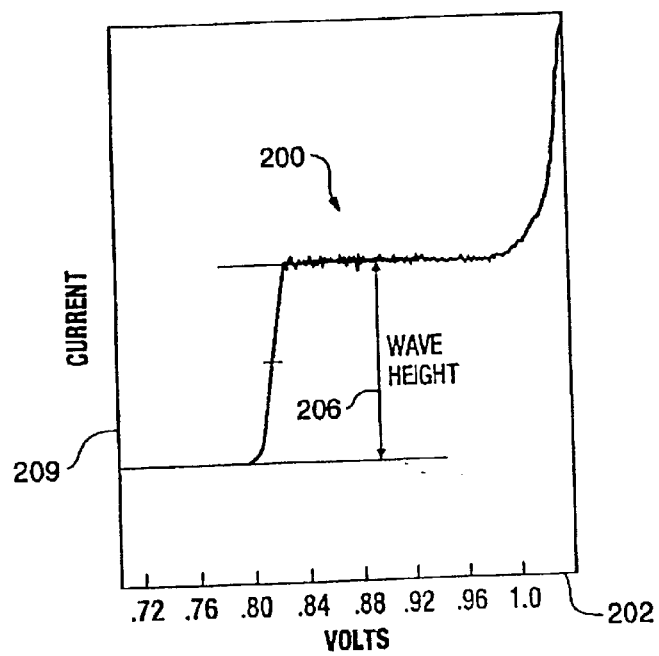
FIG. 2 is a representative polarographic current-voltage curve for carbonate.
Figure 3:
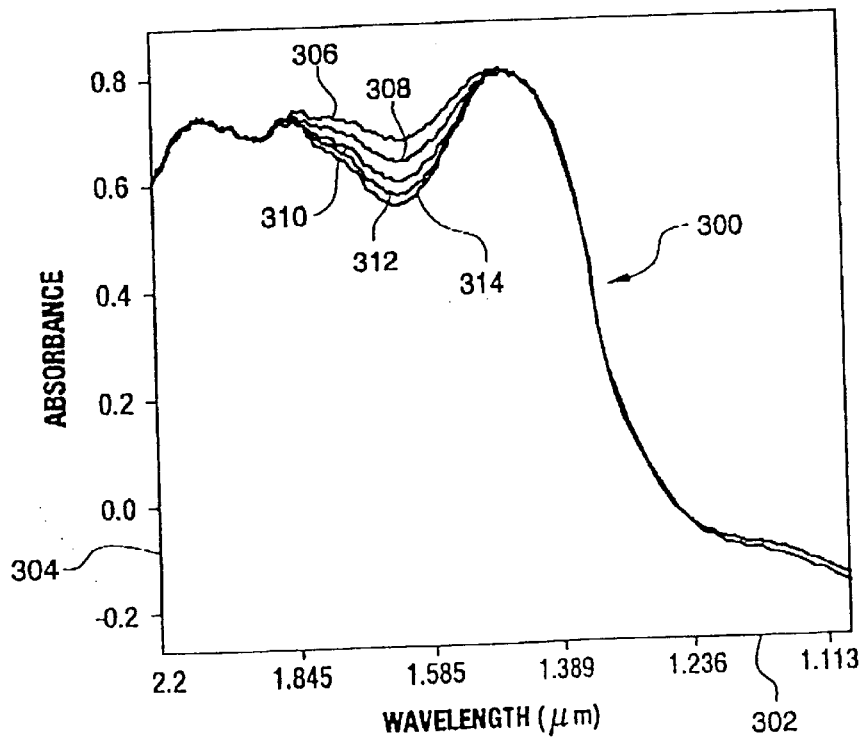
FIG. 3 is an absorbance spectra for different mixtures of liquor components.

Liquor Component Measurements—FIGS. 1–3

There are basically two categories of measurements made of the liquors in the process of the present invention. One category can be termed the "ambient liquor measurements" or "ambient measurements" and the other is the "liquor component measurements" or "component measurements". The ambient measurements include the temperature, pH, flow rate and density of the liquor as it is processed through slaker 110 and causticizers 120, 122 and 124. The ambient measurements are made by sensors 128, 130 and 132 and the measurement signals are transmitted to controller 50 over conductors 129, 131 and 133, respectively. The nature of these measurements is not critical to the present invention. Those skilled in the art recognize that in practice there will be different sensors for each of the ambient measurements and that each of the ambient measurements can be made using a variety of different measurement technologies.

The liquor component measurements are made by sensors 115, 117 and 126. The measurements made by these sensors provide data to controller 50 that is indicative of the relative concentrations of the primary components (NaOH, Na₂CO₃, Na₂S) of the green and white liquors. The measurement technology used to determine the relative concentrations of the liquor components is not critical to the successful implementation of the invention. Rather it is the determination of the relative concentrations of the liquor components, as opposed to a measurement of a characteristic of the total liquor, that is important to the methods of the present invention. Two alternative embodiments utilizing different measurement technologies for determining the liquor component measurements are described below.

A measurement technology that is used to determine the relative concentrations of the individual liquor components is polarographic measurements. The basic concept behind polarographic measurements is the recognition that, for certain chemical components, there is a given voltage range over which the current flowing between electrodes of a measuring device placed in the solution varies from a small level, that is essentially independent of the voltage applied to the solution, up to an intermediary quasi-stable level that varies with the content of the component of interest in the liquor to a very high level that again is essentially independent of the voltage applied to the measuring device.

A polarographic measurement of a given component of a liquor involves obtaining repeated measurements of current-voltage points for voltages within a potential region of interest for that particular component. The various current-voltage measurements form a polarographic-current curve for the given component that can be compared to a similar curve for a solution having a known content of the given component to provide an indication of the content of the specific component.

An exemplary polarographic current-voltage curve 200 is illustrated in FIG. 2 for Na₂CO₃. Axis 202 represents the voltage applied to the Na₂CO₃ containing liquor. Axis 204 represents the amount of current flowing in the liquor between the electrodes of the polarographic measurement device. As shown in FIG. 2, as the voltage is varied from 0.72 V to 1.0 V, the current detected by the measuring device is minimal and the changes in the voltage level have little effect on the magnitude of the detected current. As the voltage reaches 0.8 V, however, the current begins to rise and reaches a quasi-stable level which is referred to as wave height 206. The magnitude of the current at this quasi-stable level corresponds to the content of Na₂CO₃ in the measured liquor. As the voltage increases further past 1.6 V, the current begins to increase rapidly. By comparing this wave height 206 for Na₂CO₃ with the wave heights obtained by taking similar measurements in a known solution having a known content of Na₂CO₃, the content of the Na₂CO₃ in the solution under examination can be determined. The COOK-STAR Liquor Strength Analyzer available from In Line Sensors Inc. is one suitable device for making such measurements.

In an embodiment of the present invention, polarographic measurements are made by sensor 115 to determine the relative concentrations of NaOH, Na₂CO₃ and Na₂S in the green liquor just prior to the green liquor entering slaker 110. Polarographic measurements are made by sensor 117 to determine the relative concentrations of NaOH, Na₂CO₃ and Na₂S in the white liquor just after slaker 110. A third set of polarographic measurements are made by sensor 126 to determine the relative concentrations of NaOH, $Na_2CO_3$ and $Na_2S$ in the white liquor after the white liquor has been processed through the series of causticizers. The measurement signals from sensors 115, 117 and 126 indicating the relative concentrations of NaOH, $Na_2CO_3$ and $Na_2S$ are transmitted to controller 50 and processed as described below. Although only a single wire is shown between each sensor 115, 117 and 126 and controller 50, multiple wires, one for each liquor component measured, may be used in practice.

A second measurement technology that can be used to determine the relative concentrations of the NaOH, $Na_2CO_3$ and $Na_2S$ is near-infrared analysis. A spectrometer capable of scanning wavelengths between 1100 nano-meters (nm) and 2200 nm, the near-infrared range, is used to measure the relative concentrations of the NaOH, $Na_2CO_3$ and $Na_2S$. An example of such a device is the MLA 8100 Multiple Component Liquid Process Analyzer available from Rosemount Analytical. The basic principle underlying spectroscopy is that different materials absorb light of different wave lengths to varying degrees. Light will be absorbed by a system when the frequency of the light is in resonance with some natural frequency of that system. The relative absorbance of a material is plotted, or stored in a look-up table, and compared against the absorbance spectra of known materials. Spectrometers operating in the near-infrared region are effective for measuring the materials of interest in the causticizing reaction.

FIG. 3 depicts the absorbance spectra 300, referenced to air, for five water-based solutions having different combinations of NaOH, $Na_2CO_3$ and $Na_2S$. Axis 302 represents the wavelength of light incident upon the solution from the spectrometer. Axis 304 represents the absorbance of a particular wavelength of light by a particular solution. The units of axis 304 are referenced to the absorbance of the same wavelength of light by air. Absorbance spectra 300 is comprised of the overlaid spectra, 306–314, of five different solutions each having its own characteristic spectrum. The composition of the five solutions is summarized in the following table.

| | |
|---|---|
| Spectrum 306 | 8.95% NaOH, 2% $Na_2S$, 3% $Na_2CO_3$ |
| Spectrum 308 | 10% NaOH |
| Spectrum 310 | 9.3% $Na_2S$ |
| Spectrum 312 | 9.9% $Na_2CO_3$ |
| Spectrum 314 | 3% NaOH, 5% $Na_2S$, 3% $Na_2CO_3$ |

Spectra 306–314 are characteristic of the typical range of concentrations seen in the liquors of the causticization process. An analyzer such as the MLA 8100 Multiple Component Liquid Process Analyzer must be calibrated on solutions of materials having known concentrations of component chemicals. The measured absorbance spectra, determined at sensors 115, 117 and 126, are compared to the known spectra to determine the relative concentrations of NaOH, $Na_2CO_3$ and $Na_2S$ in the liquors at the various measurement points. This comparison is most easily accomplished by utilizing look-up tables holding values characterizing the known spectra. There are various methods known to those skilled in the art for comparing a measured wave form to a family or spectra of known waveforms. The liquor component measurements signals are transmitted over lines 116, 118 and 127 to controller 50.

Figure 4:
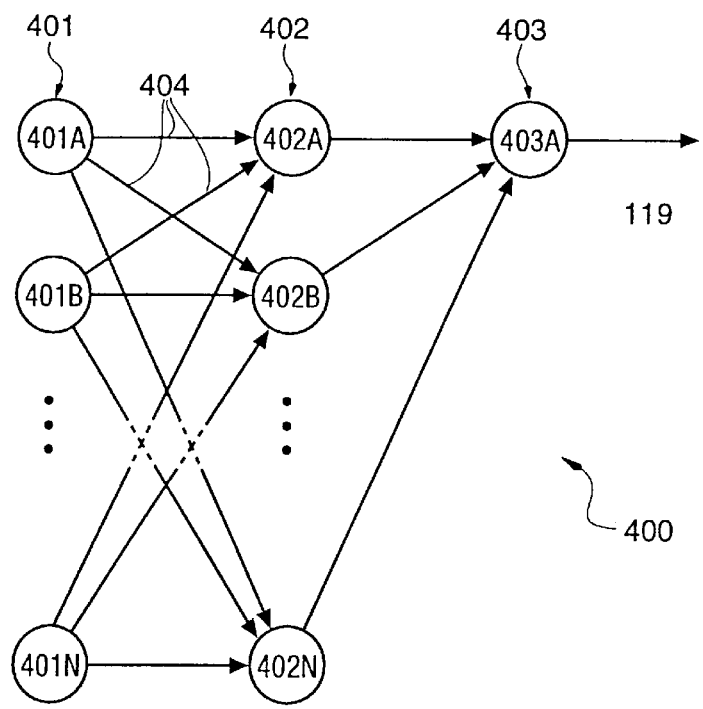
FIG. 4 is a simplified schematic view of a neural network according to the present invention.
Figure 5:
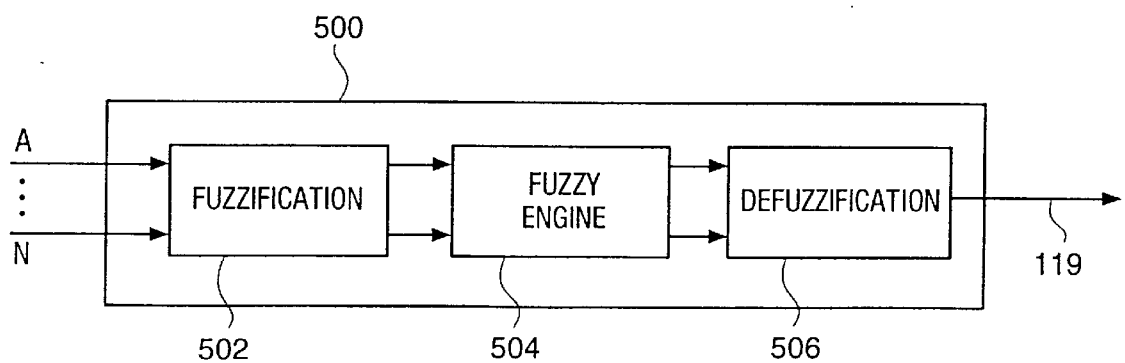
FIG. 5 is a block diagram of a fuzzy logic controller according to the present invention.

Controller Operation—FIGS. 1, 4–5

The relationship between the individual liquor component measurements from sensors 115, 117 and 126 is complex and non-linear. Adding to the complexity is the ambient measurements from sensors 128, 130 and 132. Controller 50 is presented with as many as 20 or more inputs which are processed to produce the appropriate causticizing control signal over line 119. Any rigid mathematical formulation that could be developed to correlate the multiple inputs to the desired output would not only be prohibitively costly to develop and implement but would also suffer reduced performance. This is because any traditional mathematical formulation developed would necessarily require simplifying assumptions to make possible its implementation and these assumptions will introduce error in real world applications. Methods of utilizing non-linear, application adaptable controllers are therefore provided by the methods of the present invention to achieve an installation-specific configuration for controller 50. One approach, described with respect to FIG. 4, utilizes the methods of neural networks and another approach, described with respect to FIG. 5, utilizes the methods of fuzzy logic controllers.

Neural Network—FIG. 4

One embodiment of a non-linear, application adaptable controller 50 of the present invention utilizes a trained neural network 400 to process the liquor component measurement signals and the ambient measurement signals to produce an appropriate causticizing control signal. In general, a neural network is a network of adaptable nodes which, through a process of learning from examples, stores experiential knowledge and makes that knowledge available for future use. In the methods of the present invention, a historical database including liquor component measurement data, ambient measurement data and output or causticizing control data is used to "train" the neural network to select the causticizing control signal that is appropriate for a given set of liquor component measurement data and ambient measurement data.

Neural networks are known to those skilled in the art and there are many commercial packages available for the training and implementation of a neural network for a specific application. One example of such a commercially available package is the Intelligent Sensor Tool Kit (ISTK) available from Fisher-Rosemount Systems, Inc. of Austin, Tex. The ISTK implements a three-layer feedforward network. FIG. 4 is representative of a three-layer feedforward network 400 as implemented in the ISTK Input layer 401, containing nodes 401A–401N, receives input information in the form of the liquor component measurement data and the ambient measurement data. There is a node 401A–401N for every measurement point input to controller 50 over lines 116, 118, 127, 129, 131, and 133. Note that each of the above signal lines represents more than one data path as, for example, line 116 may in practice be three lines, one for each liquor component measurement. Output layer 403 contains a single node 403A from which the causticizing control signal is output over line 119. Intermediary layer 402, containing nodes 402A–402N, may contain more nodes or less nodes depending on, but not limited to, the number of neurons in input layer 401, the level of accuracy required of neural network 400, and the number of neurons in output layer 403. The signals input to input layer 401 are assigned different "weights" by the input neurons 401A–401N. These weighted intermediary signals are then applied as inputs to intermediary neurons 402A–402N over neuron connectors 404. Intermediary neurons 402A–402N each assign different weights to the various intermediary signals to produce a second set of intermediary signals. This second set of intermediary signals is applied to neuron 403A of output layer 403.

A neural network must be trained for a given application. The weights associated with each neuron are adjustable during training and are fixed after being trained. The training and implementation of a neural network, once the appropriate inputs have been selected, is known to those skilled in the art of advanced process control tools. In general, the first step is to assemble a database of historical data. In the present invention this historical database includes ambient measurement data and liquor component measurement data. The extent to which one must gather or create data prior to implementation of the neural network depends on the past practices in that facility with respect to process control methodology and data collection. In some plants, a sizable database will already exist, especially with respect to the ambient measurement data. In other plants it will be necessary to collect data for a time in order to assemble the necessary data for training the neural network. In most plants it will be necessary to collect individual component measurement data for neural net training purposes as this has not been one of the traditional measurements made in the causticizing process.

Once the database is established there is a step of data preprocessing. Outlier data points are removed and interpolations of missing data regions may be performed to properly condition the database for the training process. A portion of the database is then used for training while the remainder of the database is reserved as a testing set of data for testing the neural network during the training process.

The training data is input to input layer 401 of network 400 and is forward propagated through all the layers of the network and finally to output layer 403. This step is known as "feedforward propagation" or "forward propagation". The output of layer 403 is compared to the desired causticizing control signal for the given inputs. If the output provides the appropriate causticizing control signal then the neural network is trained. If the output differs from the desired causticizing control signal then the weights of the nodes are adjusted according to known methodologies. This process is known as "back propagation" or "error back propagation". After each cycle of feedforward propagation and back propagation, sometimes referred to as one "training epoch", the testing set of data is applied to the inputs of the neural network. The above process is repeated for as many training epochs as are necessary to achieve the desired accuracy and predictability of the causticizing control signal.

When neural network 400 of controller 50 is trained, the appropriate causticizing control signal for a given set of inputs to controller 50 is output over conductor 119. The causticizing control signal over line 119 controls the operation of actuator 113. Actuator 113 cooperates with lime conveyor 112 to cause lime conveyor 112 to move lime from lime hopper 111 to slaker 110. When, according to the inputs to controller 50, more or less lime is needed in slaker 110, the causticizing control signal adjusts the speed of lime conveyor 112 appropriately. It should be apparent to those skilled in the art that the specific implementation of lime hopper 111, lime conveyor 112 and actuator 113 is not important to the methods of the present invention. For example, lime conveyor 112 could be replaced with a drive screw that is as effective as lime conveyor 112 in moving lime from lime hopper 111 to slaker 110. The methods of the present invention simply require that there be a mechanism responsive to the causticizing control signal for adjusting the rate of lime introduced to slaker 110.

Fuzzy Logic—FIG. 5

Another embodiment of non-linear, application adaptable controller 50 of the present invention utilizes a fuzzy logic controller 500 to process the liquor component measurement signals and the ambient measurement signals to produce an appropriate causticizing control signal. Fuzzy logic controllers, like neural networks, are particularly well suited for control of non-linear processes. Fuzzy logic controllers typically use a set of scaling factors associated with a set of membership functions to translate continuous input signals into fuzzy logic variables. A set of fuzzy logic inference rules are then applied to the fuzzy logic variables to determine an output fuzzy logic signal which is, in turn, converted into a continuous signal for use in controlling the process. Although the scaling factors can be determined in a number of ways, most fuzzy logic controllers determine the scaling factors from values developed from the process being controlled, i.e., form one or more process characteristics. The process of periodically measuring one or more process characteristics and developing a new set of scaling factors based or those process characteristics is referred to as tuning the controller.

Referring now to FIG. 5, a typical fuzzy logic controller 500 is generally described. Fuzzy logic controller 500 includes an input signal fuzzification block 502, a fuzzy engine block 504 and a defuzzification block 506. The fuzzification block 502 translates or transforms the inputs A through N into linguistic fuzzy variables, such as, for example, Positive Large, Negative Large, Zero, etc., with the use of so-called fuzzy membership functions. Likewise the defuzzification block 506 translates a fuzzy variable representing a chance in a control action into a continuous change in the causticization control signal with the use of fuzzy membership functions.

The fuzzy membership functions used in the fuzzification block 502 and the defuzzification block 506 may be defined based on prior knowledge about the process. Similarly to neural networks, a reliable database of expected measurement values is useful for tuning the fuzzy logic controller for use in a particular application or installation. The signals A through N are scaled so that they each have values that are greater than or equal to −1 and less than or equal to 1. The membership functions are used to condition the scaled signals prior to their input to fuzzy engine block 504.

The fuzzy engine block 504 operates on the fuzzified input signals developed by fuzzification block 502 by applying inference rules comprising, for example, a set of linguistic rules which incorporate human experience, to produce a control action. The inference rules are a series of statements in the form of "if . . . then . . . " A fundamental requirement of these rules is that they perform negative feedback control for the sake of stability.

Any desired number of rules and membership functions can be used in fuzzification block 502 to translate the input signals A through N into fuzzy logic variables for use by fuzzy engine block 504. Furthermore, any desired number of membership functions can be used in the defuzzification block 506 to translate the change in the control action into the continuous causticization control signal.

After the inference rules are applied to establish the required scaled change in the control signal from the membership functions of the scaled input signals A through N, defuzzification of the scaled change in the control signal is performed by defuzzification block 506. Defuzzification may be performed using any desired method including, for example, the center of gravity defuzzification method and the generalized center of gravity defuzzification method, both methods known by one skilled in the art. Thereafter, the scaled change in the control signal is descaled by multiplication with an appropriate scaling factor to arrive at the causticization control signal output over wire 119. As noted above, two distinct features of the fuzzy logic controller 500 are that human experience can be integrated into the causticization control signal and that fuzzy logic controller 500 provides a non-linear relationship between the input signals A through N and the output causticization control signal developed by fuzzy logic controller 500. It should be apparent to those skilled in the art that there are numerous approaches to implementing a fuzzy logic controller according to the methods of the present invention. There are also numerous commercially available packages for implementing fuzzy logic controllers, many of which are applicable to the methods of the present invention. An example of one such commercially available package is the Intelligent Fuzzy Logic Controller available from Fisher-Rosemount Systems, Inc. of Austin, Tex.

As was described with respect to the neural network embodiment of controller 50, the causticization control signal is output from controller 50 over line 119. The causticization control signal determines the operation of actuator 113 which in turn controls the operation of lime conveyor 112 thereby providing the proper amount of lime from lime hopper 111 to slaker 110.

It is to be expressly understood that the claimed invention is not to be limited to the description of the preferred embodiment but encompasses other modifications and alterations within the scope and spirit of the inventive concept.

What is claimed is:

1. A method of controlling the causticizing reaction for producing a white liquor having multiple white liquor components from a green liquor having multiple green liquor components, comprising the steps of:

measuring a characteristic of each of said green liquor components;

measuring a characteristic of each of said white liquor components;

evaluating said green liquor component characteristics and said white liquor component characteristics in a non-linear, application adaptable controller to produce a causticizing control signal, wherein said evaluating step includes use of processing selected from the group consisting of neural network processing, fuzzy logic processing, and functional equivalents thereof for evaluating said green liquor component characteristics to produce said causticizing control signal with use of installation-specific data; and controlling said causticizing reaction responsive to said causticization control signal to produce white liquor.

2. The method according to claim 1 wherein said step of measuring said characteristic of said green liquor components includes:

measuring a relative concentration of each of said green liquor components before said green liquor enters a slaker.

3. The method according to claim 2 wherein said step of measuring a relative concentration includes:

obtaining a relative concentration measurement of each of said green liquor components from a near-infrared spectrometer positioned to provide said relative concentration measurements before said green liquor enters said slaker.

4. The method according to claim 2 wherein said step of measuring a relative concentration includes:

obtaining a relative concentration measurement of each of said green liquor components from a polarographic measurement device positioned to provide said relative concentration measurements before said green liquor enters said slaker.

5. The method according to claim 1 wherein said step of measuring said characteristic of said white liquor components includes:

measuring a relative concentration of each of said white liquor components after said white liquor exits from a slaker.

6. The method according to claim 5 wherein said step of measuring a relative concentration includes:

obtaining a relative concentration measurement of each of said white liquor components from a near-infrared spectrometer positioned to provide said relative concentration measurements after said white liquor exits from said slaker.

7. The method according to claim 5 wherein said step of measuring a relative concentration includes:

obtaining a relative concentration measurement of each of said white liquor components from a polarographic measurement device positioned to provide said relative concentration measurements after said white liquor exits from said slaker.

8. The method according to claim 5 wherein said step of measuring said relative concentration includes:

measuring a first relative concentration of each of said white liquor components after said white liquor exits from said slaker; and measuring a second relative concentration of each of said white liquor components after said white liquor exits from a causticizer.

9. The method of claim 1 wherein said step of evaluating said green liquor component characteristics and said white liquor component characteristics includes:

adapting said controller to optimize the production of white liquor in a specific installation;

transmitting said white liquor component characteristics and said green liquor component characteristics to an input stage of said controller; and processing said white liquor component characteristics and said green liquor component characteristics to produce said causticizing control signal according to said installation-specific configuration of said controller.

10. The method of claim 9 wherein said step of adapting said controller includes:

assembling a database containing data correlating said green liquor component characteristics and said white liquor component characteristics with said causticizing control signal;

applying said database to said controller; and adjusting, responsive to said applying step, configuration parameters of said controller whereby said controller produces an appropriate causticizing control signal for a given set of green liquor component characteristics and white liquor component characteristics.

11. The method of claim 10 wherein said step of applying said database to said controller includes:

applying said database to a programmable neural network.

12. The method of claim 10 wherein said step of applying said database to said controller includes:

applying said database to a programmable fuzzy logic controller.

13. The method of claim 9 wherein said step of evaluating said green liquor component signals and said white liquor component signals further includes:

measuring ambient conditions of said green liquor and generating in response thereto green liquor ambient measurement signals;

measuring ambient conditions of said white liquor and generating in response thereto white liquor ambient measurement signals;

transmitting said green liquor ambient measurement signals and said white liquor ambient measurement signals to said controller;

processing said white liquor component characteristics, said green liquor component characteristics, said white liquor ambient measurement signals and said green liquor ambient measurement signals to produce said causticizing control signal.

14. An apparatus for controlling the causticizing reaction to produce a white liquor having multiple white liquor components from a green liquor having multiple green liquor components, said apparatus comprising:

a green liquor sensor for measuring a characteristics of each of said green liquor components;

a white liquor sensor for measuring a characteristics of each of said white liquor components;

a non-linear, application adaptable controller responsive to said green liquor component characteristics and said white liquor component characteristics for producing a causticizing control signal wherein said non-linear, application adaptable controller is selected from the group consisting of neural network controllers, fuzzy logic controllers, and functional equivalents thereof for evaluating said green liquor component characteristics to produce said causticizing control signal with use of installation-specific data; and means for controlling said causticizing reaction responsive to said causticization control signal to produce white liquor.

15. The apparatus according to claim 14 wherein said green liquor sensor comprises:

a relative concentration instrument for measuring a relative concentration of each of said green liquor components before said green liquor enters a slaker.

16. The apparatus according to claim 15 wherein said relative concentration instrument comprises:

a near-infrared spectrometer positioned to provide said relative concentration measurements before said green liquor enters said slaker.

17. The apparatus according to claim 15 wherein said relative concentration instrument comprises:

a polarographic measurement device positioned to provide said relative concentration measurements before said green liquor enters said slaker.

18. The apparatus according to claim 14 wherein said white liquor sensor comprises:

a relative concentration instrument for measuring a relative concentration of each of said green liquor components after said white liquor exits from a slaker.

19. The apparatus according to claim 18 wherein said relative concentration instrument comprises:

a near-infrared spectrometer positioned to provide said relative concentration measurements after said white liquor exits from said slaker.

20. The apparatus according to claim 18 wherein said relative concentration instrument comprises:

a polarographic measurement device positioned to provide said relative concentration measurements after said white liquor exits from said slaker.

21. The apparatus of claim 14 wherein said non-linear, application adaptable controller comprises:

means for receiving said white liquor component characteristics and said green liquor component characteristics; and means for processing said white liquor component characteristics and said green liquor component characteristics to produce said causticizing control signal according to said installation-specific configuration.

22. The apparatus of claim 21 wherein said means for processing, comprises:

means for receiving database values from a database wherein said database contains data correlating said green liquor component characteristics and said white liquor component characteristics with said causticizing control signal; and means for adjusting, responsive to said means for receiving database values, configuration parameters of said controller whereby said controller produces an appropriate causticizing control signal for a given set of green liquor component characteristics and white liquor component characteristics.

23. The apparatus of claim 22 wherein said non-linear, application adaptable controller comprises a programmable neural network.

24. The apparatus of claim 22 wherein said non-linear, application adaptable controller comprises a programmable fuzzy logic controller.

* * * * *